United States Patent
Wang et al.

(10) Patent No.: US 12,010,750 B2
(45) Date of Patent: Jun. 11, 2024

(54) RADIO LINK MAINTENANCE INVOLVING MULTIPLE UPLINK CARRIERS

(71) Applicant: Telefonaktiebolaget LM Ericsson (publ), Stockholm (SE)

(72) Inventors: Min Wang, Luleå (SE); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 77 days.

(21) Appl. No.: 16/959,270

(22) PCT Filed: Jan. 11, 2019

(86) PCT No.: PCT/EP2019/050716
§ 371 (c)(1),
(2) Date: Jun. 30, 2020

(87) PCT Pub. No.: WO2019/138087
PCT Pub. Date: Jul. 18, 2019

(65) Prior Publication Data
US 2020/0337102 A1    Oct. 22, 2020

Related U.S. Application Data

(60) Provisional application No. 62/616,194, filed on Jan. 11, 2018.

(51) Int. Cl.
*H04W 76/18* (2018.01)
*H04L 1/1867* (2023.01)
(Continued)

(52) U.S. Cl.
CPC ............ *H04W 76/18* (2018.02); *H04L 1/189* (2013.01); *H04W 24/08* (2013.01);
(Continued)

(58) Field of Classification Search
CPC . H04W 76/18; H04W 24/08; H04W 36/0079; H04W 36/0085; H04W 36/08;
(Continued)

(56) References Cited

U.S. PATENT DOCUMENTS 9,326,167 B2 *   4/2016   Andrianov ............ H04W 24/02
9,723,647 B2 *   8/2017   Yu .......................... H04W 76/19
(Continued)

FOREIGN PATENT DOCUMENTS

CN     104685930 A    6/2015
JP     2015122735 A   7/2015
(Continued)

OTHER PUBLICATIONS

Samsung, "Connected mode aspects of supplementary uplink frequency", 3GPP TSG-RAN WG2 #99bis, Prague, Czech Republic, Oct. 9, 2017, pp. 1-4, R2-1711808, 3GPP.
(Continued)

*Primary Examiner* — Man U Phan
(74) *Attorney, Agent, or Firm* — COATS & BENNETT, PLLC

(57) ABSTRACT

The invention refers to a method in a user equipment, UE (200), for handling radio link failures, wherein the UE is connected to a radio communication network by means of a plurality of uplink, UL, carriers (220, 230), comprising: monitoring (S41) retransmissions of radio link control, RLC, data packets for at least two of the plurality of UL carriers, determining (S42) a failure of RLC data packet transmissions with respect to one of the UL carriers, and providing (S43) an information indicative of the failure and said UL carrier; the invention further refers to a method in the UE (200), for handling radio link failures, wherein the UE is connected to a radio communication network by means of a plurality of UL carriers (210, 220, 230), com-
(Continued)

Figure 1:
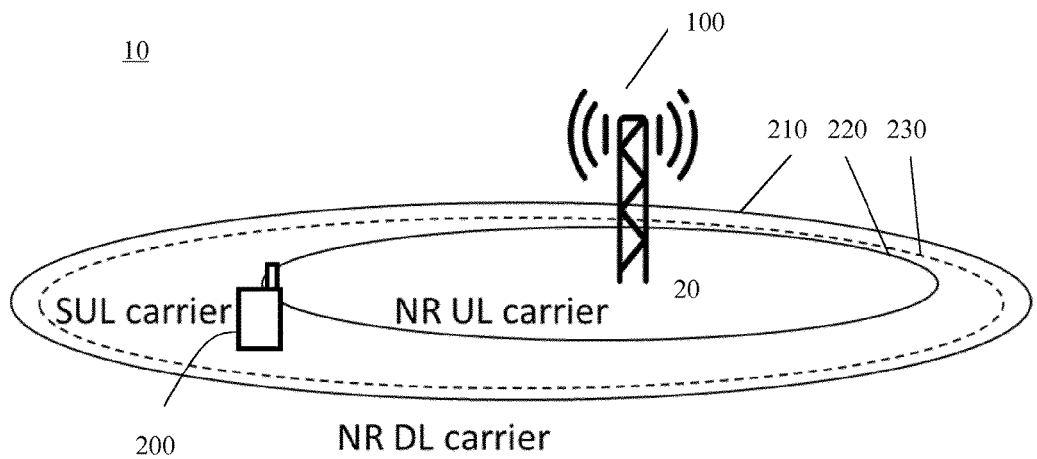

S41: monitoring retransmissions of radio link control, RLC, data packets separately for a plurality of UL carriers

↓

S42: determining a failure of RLC data packet transmissions with respect one of the UL carriers

↓

S43: providing an information indicative of the failure and said UL carrier.

prising performing (S61) retransmissions of a certain RLC data packet on at least two of the plurality of UL carriers, monitoring (S62) retransmissions of a radio link control, RLC, data packet commonly for bthe at least two UL carriers, and providing (S63) an information indicative of a common RLF; the invention further refers to corresponding methods in a base station (100), corresponding UEs (200) and base stations (100), a corresponding communication system and a corresponding method in the communication system.

14 Claims, 9 Drawing Sheets

(51) Int. Cl.
| | |
|---|---|
| *H04W 24/08* | (2009.01) |
| *H04W 36/00* | (2009.01) |
| *H04W 36/08* | (2009.01) |
| *H04W 36/30* | (2009.01) |
| *H04W 74/0833* | (2024.01) |
| *H04W 80/02* | (2009.01) |

(52) U.S. Cl.
CPC ... *H04W 36/0079* (2018.08); *H04W 36/0085* (2018.08); *H04W 36/08* (2013.01); *H04W 36/305* (2018.08); *H04W 74/0833* (2013.01); *H04W 80/02* (2013.01)

(58) Field of Classification Search
CPC ........... H04W 36/305; H04W 74/0833; H04W 80/02; H04W 36/30; H04W 76/00; H04W 28/04; H04W 16/32; H04W 48/16; H04W 72/04; H04W 76/15; H04W 76/11; H04W 76/19; H04W 76/27; H04W 36/04; H04W 36/28; H04W 16/24; H04L 1/18; H04L 5/006; H04L 1/867; H04L 1/189; H04L 51/30; H04L 5/001; H04L 5/0098; H04L 1/1867
USPC ......................................................... 370/329
See application file for complete search history.

(56) References Cited

U.S. PATENT DOCUMENTS

| | | | | |
|---|---|---|---|---|
| 9,854,495 | B2* | 12/2017 | Kim ................ | H04W 36/0044 |
| 9,894,702 | B2* | 2/2018 | Mishra ................ | H04W 36/08 |
| 9,973,902 | B2 | 5/2018 | Jung et al. | |
| 10,484,931 | B2* | 11/2019 | Dinan ................ | H04W 76/18 |
| 10,743,362 | B2* | 8/2020 | Park ................ | H04W 76/27 |
| 10,750,562 | B2* | 8/2020 | Park ................ | H04L 5/0055 |
| 11,102,057 | B2* | 8/2021 | Tang ................ | H04L 41/0668 |
| 11,117,274 | B2* | 9/2021 | Mojica ................ | B26B 3/00 |
| 11,122,507 | B2* | 9/2021 | Takahashi ........... | H04W 24/10 |
| 11,133,978 | B2* | 9/2021 | Tang ................ | H04L 41/0668 |
| 11,516,869 | B2* | 11/2022 | Park ................ | H04L 5/0094 |
| 11,528,626 | B2* | 12/2022 | Kazmi ................ | H04W 24/02 |
| 2010/0195507 | A1 | 8/2010 | Marinier et al. | |
| 2011/0103328 | A1* | 5/2011 | Lee ................ | H04W 74/004 |
| | | | | 370/329 |
| 2012/0281527 | A1 | 11/2012 | Sebire et al. | |
| 2015/0133122 | A1 | 5/2015 | Chen | |
| 2015/0296438 | A1 | 10/2015 | Wu | |
| 2016/0029497 | A1 | 1/2016 | Zhong et al. | |
| 2016/0037579 | A1* | 2/2016 | Jung ................ | H04W 24/08 |
| | | | | 370/252 |

FOREIGN PATENT DOCUMENTS

| | | | |
|---|---|---|---|
| KR | 20150055535 A | 5/2015 | |
| RU | 2633378 C2 | 10/2017 | |
| WO | 2011100673 A1 | 8/2011 | |
| WO | 2012149898 A1 | 11/2012 | |
| WO | WO-2014111499 A1 * | 7/2014 | ........ H04W 36/0055 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15)", Technical Specification, 3GPP TS 36.300 V15.3.0, Sep. 1, 2018, pp. 1-358, 3GPP.

Toufik, I. et al., "Multi-User Scheduling and Interference Coordination", LTE—The UMTS Long Term Evolution From Theory to Practice, 2011, pp. 279-286, John Wiley & Sons Ltd.

* cited by examiner

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same Enb | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |
| NOTE: a prepared eNB is an eNB which has admitted the UE during an earlier executed HO preparation phase or obtains the UE context during the Second Phase. ||||

FIG. 3

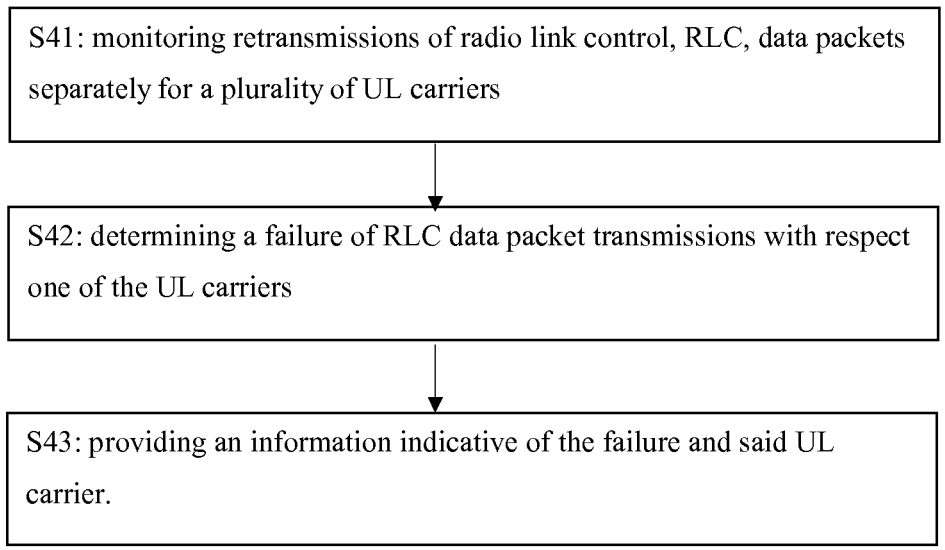

FIG. 4

S51: receiving an information of a failure of RLC data packet transmissions with respect to one of the UL carriers, said failure being determined by monitoring retransmissions of RLC data packets separately for at least two of the plurality of UL carriers

FIG. 5

S61: performing retransmissions of a certain RLC data packet on at least two of the plurality of UL carriers

↓

S62: monitoring retransmissions of a RLC data packet commonly for both UL carriers

↓

S63: providing an information indicative of a common RLF

FIG. 6

S71: receiving from the UE an information indicative of a common RLF, resulting from performing retransmissions at the UE of a certain RLC data packet on at least two of the plurality of UL carriers being commonly monitored for both UL carriers

FIG. 7

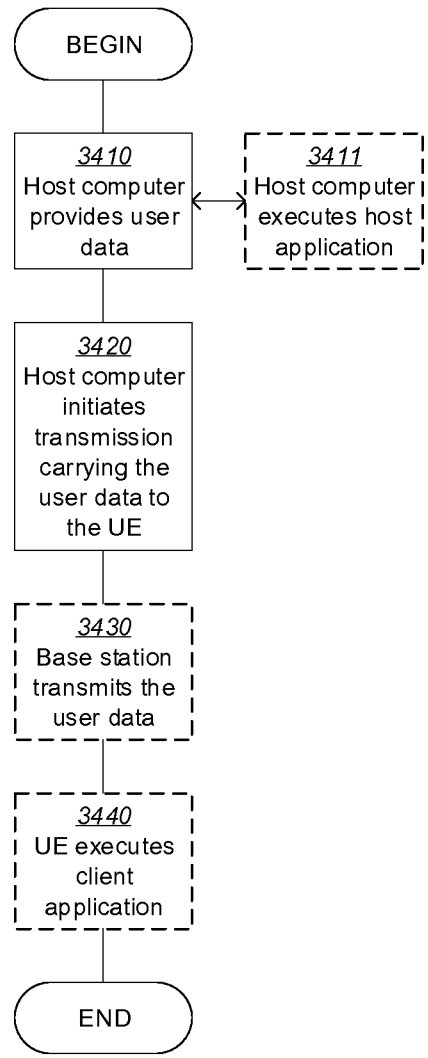
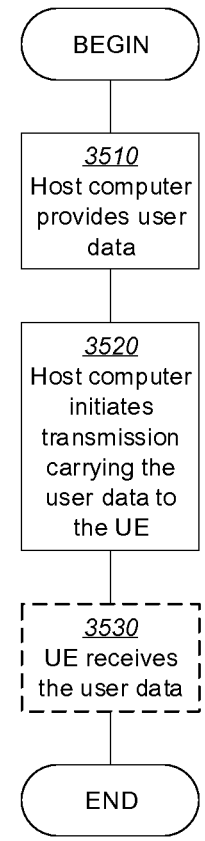
FIG. 12
FIG. 13

RADIO LINK MAINTENANCE INVOLVING MULTIPLE UPLINK CARRIERS

TECHNICAL FIELD

The invention relates to detecting and handling radio link failures. The further relates to detecting and handling of radio link failures in carrier configurations involving multiple uplink, UL, carriers, especially a primary and a supplementary UL carrier.

BACKGROUND

Supplementary Uplink (SUL) carriers may be introduced into 5G/New Radio (NR)-compliant networks to improve the uplink coverage for the networks, As relatively low carrier frequency bands are already deployed with 2G, 3G and 4G wireless communication systems, NR will be deployed at relatively higher frequencies. For wireless communication, the propagation loss is roughly proportional to the square of the carrier frequency. Hence there may be coverage problems for wireless communication over high carrier frequencies. For downlink, the network access node or NR base station (gNB) can be equipped with powerful antenna systems and powerful amplifiers to boost the transmission power density to boost the DL coverage. However, for UL (i.e. for the UE side), there are several restrictions such as transmit power, antenna size and cost. Hence there can be mismatch between UL and DL for a NR cell at high frequency.

In view of such potential problems, a supplementary uplink (SUL) carrier may be provided for a NR cell such that an NR cell has a SUL carrier and a NR UL carrier. The SUL carrier may be a relatively low frequency carrier which can be shared (in time and/or frequency domain) with other RAT systems such as LTE.

The SUL carrier may be used when the NR UL carrier is of poor radio condition. The SUL carrier may be switched off again when the radio condition of NR UL carrier becomes good enough. As the radio conditions may be varying relatively quickly over the time, such carrier switch may be frequently triggered.

LTE provides a radio link layer, RLF, procedure in LTE to assist the UE to perform a fast and reliable recovery without the need to go via RRC IDLE. Such fast and reliable recovery may be beneficial to avoid unnecessary latency due to the RACH access in RRC IDLE.

Figure 2:
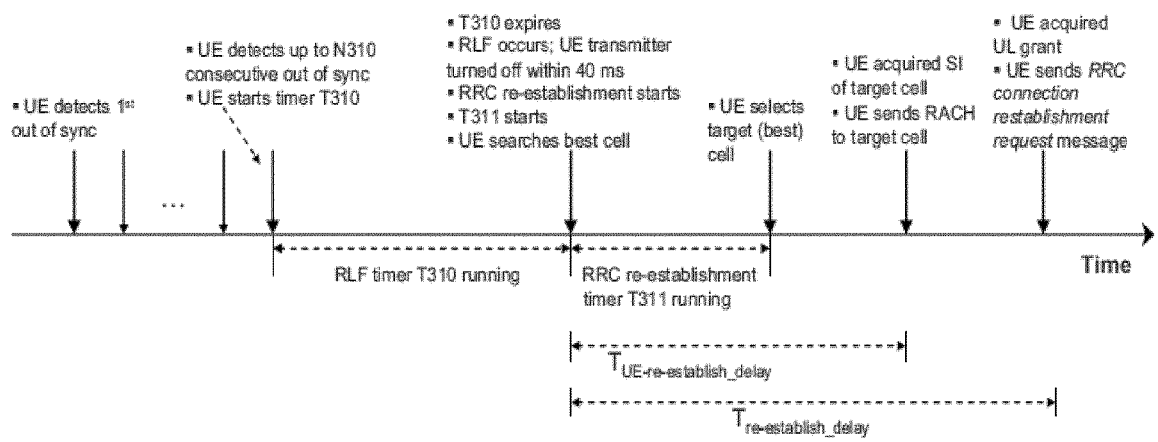

A radio link monitoring in LTE is illustrated in FIG. 2 (that corresponds to FIG. 22.8 in the book "LTE—The UMTS Long Term Evolution From Theory to Practice", 2nd edition, by Stefania Sesia, Issam Toufik and Matthew Baker. In LTE there are several reasons that may lead to the radio link failure:

1. Timer T310 expiry;
2. A maximum number of RLC retransmissions in uplink is reached; and
3. Handover failure and timer T304 expiry With respect to timer T310 expiry, while the UE is in RRC connected mode, the UE monitors the downlink radio channel quality based on the downlink reference symbol. The UE compares the measured downlink channel quality with certain thresholds: $Q_{out}$ for an out-of-sync event and $Q_{in}$ for an in-sync event respectively. The physical channel evaluates the downlink channel quality, and may periodically send indications on out-of-sync or in-sync, to layer 3. The UE layer 3 then may evaluate the radio link failure based on the in-sync and out-of-sync indications (e.g. applying a layer 3 filter). When the consecutively received out-of-sync indications are beyond the counter N310, a timer T310 is started. While T310 is running, the radio link considered to be recovered if the UE consecutively receives N311 in-sync indications from the physical layer.

When the timer T310 is expired, a radio link failure is declared or triggered by the UE.

During handover procedure, the timer T304 is started when the UE receives a handover command from the source cell, the value of the timer T304 should be set to allow the UE to try the maximum RACH access attempts to the target cell. When the timer T304 is expired, a radio link failure due to handover is detected.

When a radio link failure is triggered, a radio connection re-establishment is triggered. A UE shall first perform cell search to determine the best cell for radio link re-establishment. According to 3GPP TS 36.300 (current version 15.3.0), a UE can select the same cell, a different cell from the same eNB, or a prepared cell from a different eNB, wherein the activity can be resumed (i.e., the UE stays in connected mode) via radio connection re-establishment procedure since the previous UE context can be achieved by inter-cell communication. However, when a prepared cell is not available, the may UE select an unprepared cell. In this case, the UE has to go to idle mode and try to setup the radio connection afterwards. In this case, activity of the UE cannot be resumed. FIG. 3 shows table 10.1.6-1 from 3GPP document TS 36.300 that guides the UE behavior for target cell selection with respect to mobility and radio link failures.

For an NR cell configured with an SUL carrier, there is at least one SUL carrier and one NR UL carrier in a single cell. The existing RLF trigger mechanisms may not be sufficient for SUL case, since the UE supports two ULs in the same cell The SUL carrier may not be paired with any downlink frequency from a band-combination perspective. Instead, the SUL carrier and NR UL carrier together may be associated with a downlink NR carrier. From a technology potential point of view, there are two options to model SUL carrier. In the first option, the SUL carrier is modelled as a separate uplink carrier, different from the NR UL carrier. Both carriers are aggregated in the same way as the uplink carrier aggregation. So, the SUL carrier forms a separate Scell (secondary cell). In the second option, SUL carrier and NR UL/DL carriers are in the same cell. The SUL carrier is more like a separate UL configuration. The UE can maintain two UL configurations, while the UE may keep only one UL configuration active from time to time.

SUMMARY OF THE INVENTION

Accordingly, there is a need for a time and resource efficient technique that allows determining accurate TA information.

As to one aspect, a method in a user equipment, UE, for handling radio link failures is provided, wherein the UE is connected to a radio communication network by means of a plurality of uplink, UL, carriers, comprising:
- monitoring retransmissions of radio link control, RLC, data packets for each of a plurality of UL carriers,
- determining a failure of RLC data packet transmissions with respect to one of the UL carriers, and
- providing an information indicative of the failure of said UL carrier.

As to another aspect, a method in a user equipment, UE, for handling radio link failures is provided, wherein the UE is connected to a radio communication network by means of a plurality of uplink, UL, carriers, comprising:
 performing retransmissions of a certain RLC data packet on at least two of the plurality of UL carriers,
 monitoring retransmissions of a radio link control, RLC, data packet commonly for both UL carriers, and
 providing an information indicative of a common RLF.

As to another aspect, a user equipment, UE, for handling radio link failures is provided, wherein the UE is adapted to perform the methods described above.

As to another aspect, a method in a base station of a radio communications network, gNB, for handling radio link failures is provided, comprising: receiving an information of a failure of RLC data packet transmissions with respect one of the UL carriers, wherein said failure has been determined by separately monitoring retransmissions of radio link control, RLC, data packets separately for a least two of the plurality of UL carriers.

As to another aspect, a method in a gNB is provided, comprising: receiving from the UE an information indicative of a common RLF, wherein a common RLF is resulting from performing retransmissions at the UE of a certain RLC data packet on at least two of the plurality of UL carriers being commonly monitored for both UL carriers.

As to another aspect, base station, gNB, for handling radio link failures is provided, wherein the gNB is adapted to perform the preceding methods.

As to another aspect, a communication system is provided including a host computer comprising processing circuitry configured to provide user data; and a communication interface configured to forward the user data to a cellular network for transmission to a user equipment, UE, wherein the cellular network comprises a base station, gNB having a radio interface and processing circuitry, the base station's processing circuitry configured to perform at least one of:
 receiving an information of a failure of RLC data packet transmissions with respect to one of the UL carriers, wherein said failure has been determined by monitoring retransmissions of radio link control, RLC, data packets at the UE for each of at least two of the plurality of UL carriers, and
 receiving an information indicative of a common RLF, wherein a common RLF is resulting from performing retransmissions at the UE of a certain RLC data packet on at least two of the plurality of UL carriers being commonly monitored for both UL carriers.

As to another aspect, a method implemented in the communication system is provided comprising:
 at the host computer, providing user data; and
 at the host computer, initiating a transmission carrying the user data to the UE via a cellular network comprising the base station, wherein the base station performs at least one of:
 receiving (S51) an information of a failure of RLC data packet transmissions with respect to one of the UL carriers, wherein said failure has been determined by monitoring retransmissions of radio link control, RLC, data packets at the UE for each of at least two of the plurality of UL carriers, and
 receiving (S71) an information indicative of a common RLF, wherein a common RLF is resulting from performing retransmissions at the UE of a certain RLC data packet on at least two of the plurality of UL carriers being commonly monitored for both UL carriers.

BRIEF DESCRIPTION OF THE DESCRIPTION OF THE DRAWINGS

Figure 8:
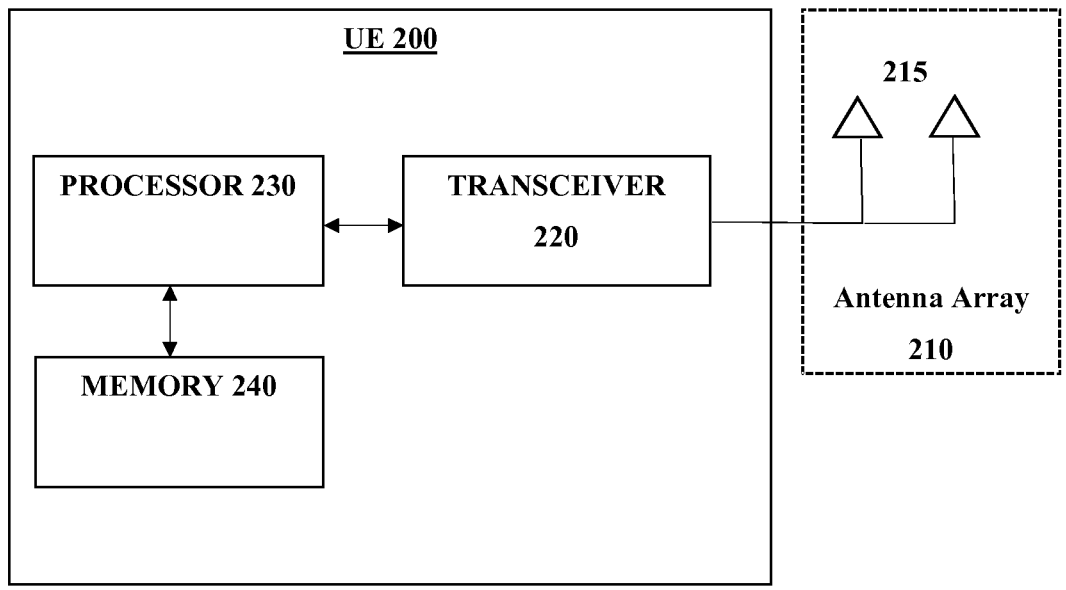
Figure 9:
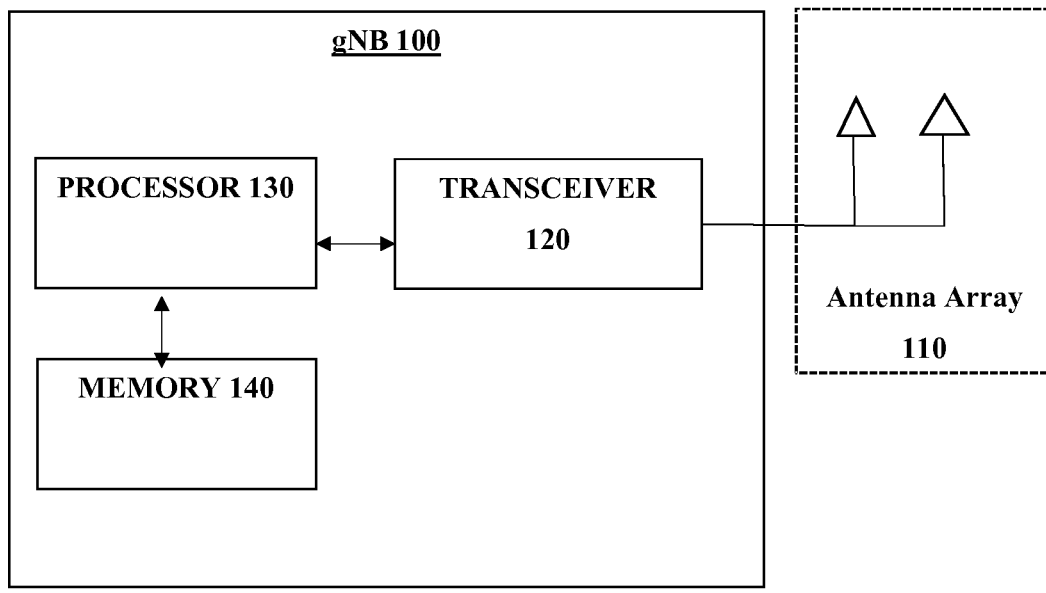
Figure 10:
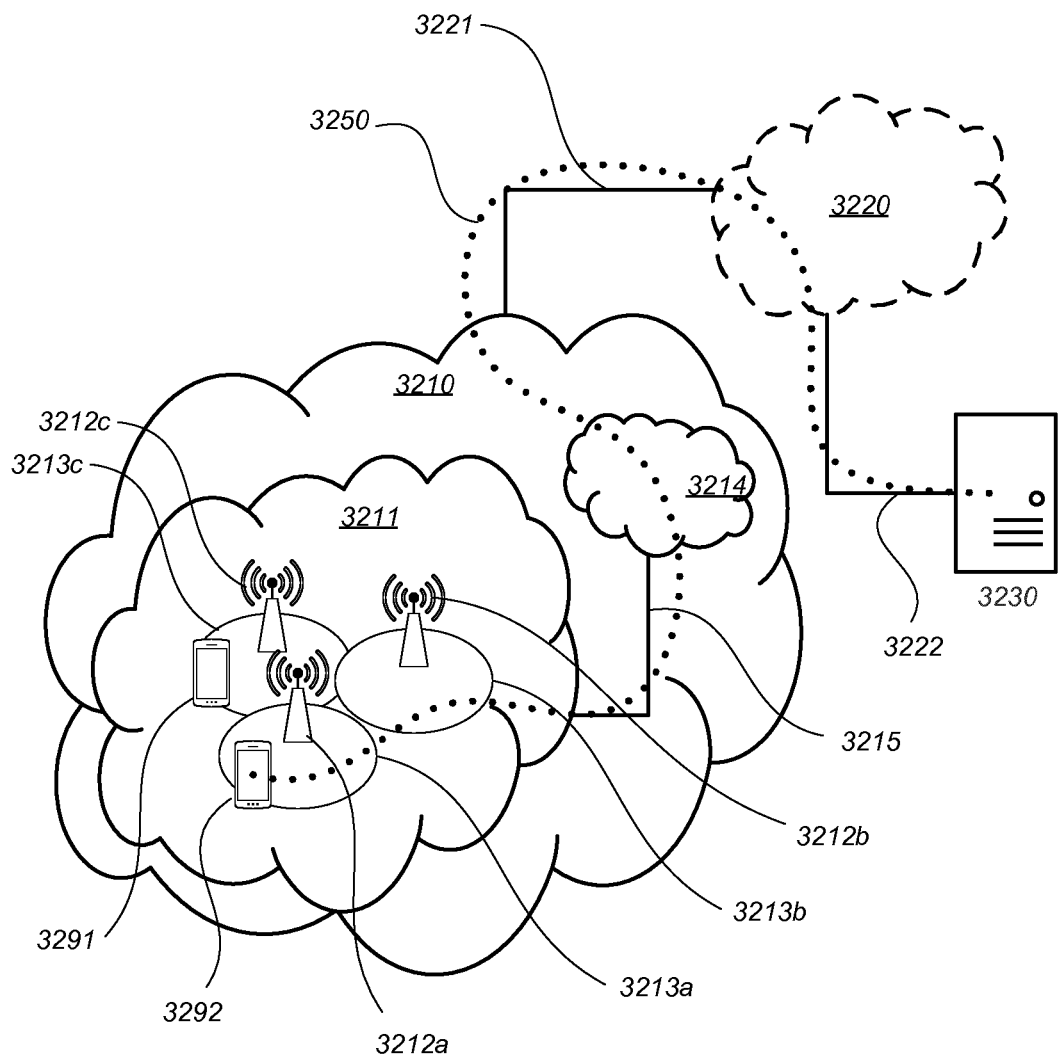
Figure 11:
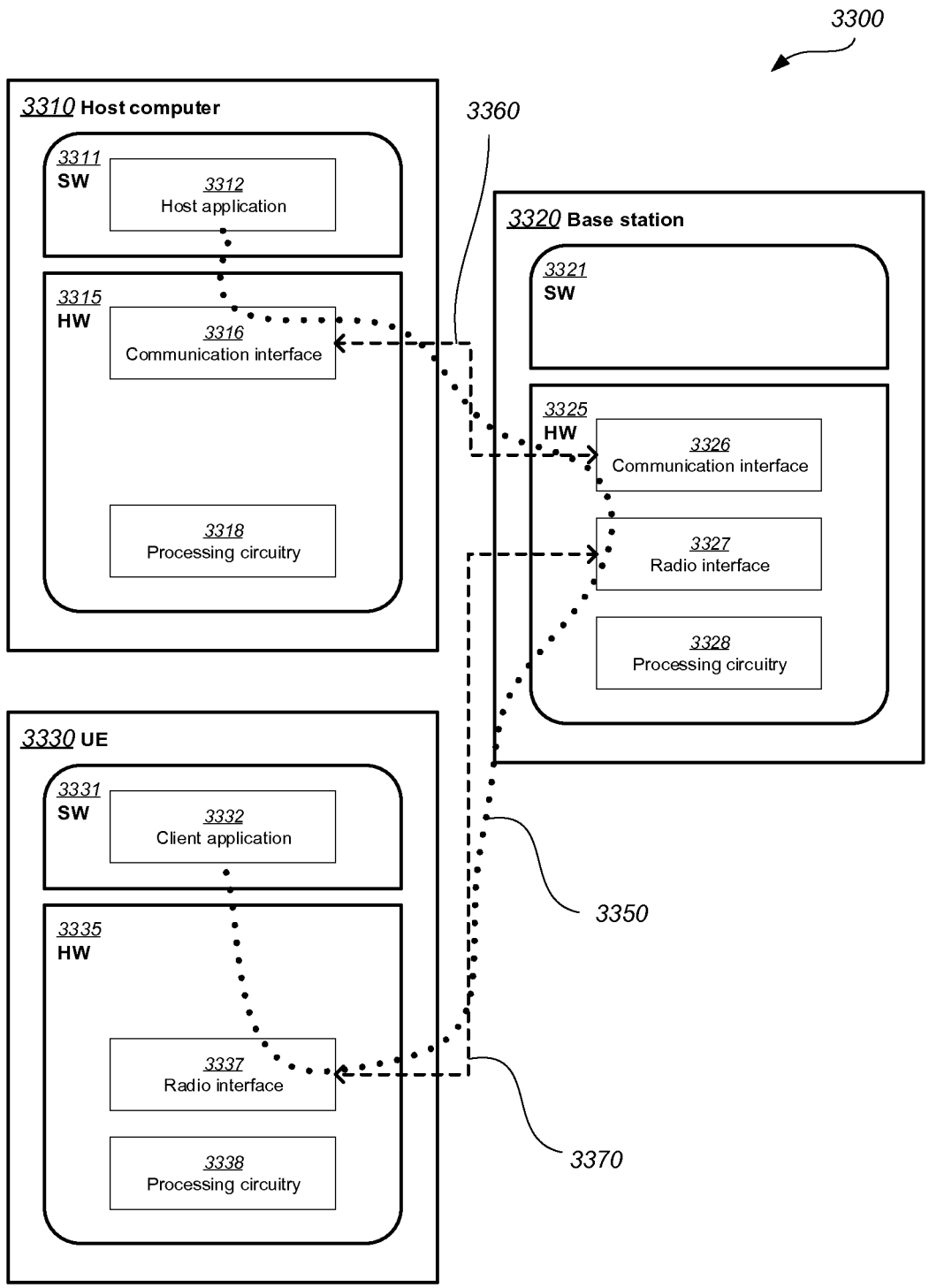

In the following, the present disclosure is described in more detail with reference to exemplary embodiments illustrated in the drawings, wherein:

FIG. 1 schematically illustrates a radio communications network comprising a base station and a UE, FIG. 2 illustrates a timeline including a radio link monitoring in LTE, FIG. 3 is a schematic table from 3GPP specifications illustrating different cases of UE behavior for target cell selection with respect to mobility and radio link failures, FIG. 4 schematically illustrates exemplary method steps performed in the UE with respect to a first embodiment, FIG. 5 schematically illustrates an exemplary method step performed in a base station according to FIG. 4, FIG. 6 schematically illustrates exemplary method steps performed in the UE with respect to a second embodiment, FIG. 7 schematically illustrates an exemplary method steps performed in a base station according to the second embodiment, FIG. 8 schematically illustrates a UE for implementing a method according to FIG. 4 or 6, FIG. 9 schematically illustrates a base station for implementing a method according to FIG. 5 or 7, FIG. 10 schematically illustrates a telecommunication network connected via an intermediate network to a host computer, FIG. 11 is a generalized block diagram of a host computer communicating via a base station with a user equipment over a partially wireless connection, and FIGS. 12 to 15 are flowcharts illustrating methods implemented in a communication system including a host computer, a base station and a user equipment.

DETAILED DESCRIPTION

FIG. 1 illustrates a wireless communication network 10 according to the NR standard currently being developed by Third Generation Partnership Project (3GPP). The wireless communication network 10 comprises one or more base stations 100 providing service to user equipment (UEs) 200 in a cell 20 of the wireless communication network 10. The base stations 100 in the wireless communication network 10 are also referred to as Evolved NodesBs (eNBs) and gNodeBs (gNBs) in 3GPP standards. Although only one cell 20 and one base station 100 are shown in FIG. 1, those skilled in the art will appreciate that a typical wireless communication network 10 comprises many cells 20 served by many base stations 100. The UEs 200 may comprise cellular telephones, smart phones, laptop computers, notebook computers, tablets, machine-to-machine (M2M) devices (also known as machine type communication (MTC) devices), or other types of wireless end user devices capable of communicating over wireless communication networks 10.

FIG. 1 further illustrates the cell 20 having different coverages of each a NR downlink carrier 210, of a primary or NR UL carrier 220 and of a supplementary uplink (SUL) carrier 230 such that the NR cell has a SUL carrier and a NR UL carrier in uplink. The SUL carrier may be a relatively low frequency carrier which can be shared (in time and/or frequency domain) with other RAT systems such as LTE. FIG. 1 exemplarily depicts different coverages of the NR UL carrier, the SUL carrier and the NR DL carrier associated to the NR cell, wherein the NR UL carrier and SUL may be paired resulting in a NR frequency combination.

A UE 200 may declare or trigger a radio link failure, RLF when it loses the synchronization with the network. As a result, the UE may release network resources and any ongoing services is interrupted.

In an embodiment, illustrated by FIG. 4, UE 200 performs the following steps:

S41: monitoring RLC retransmissions separately for a plurality of carriers e.g. a primary carrier and a supplementary carrier, S42: determining a failure of RLC data packet transmissions (RLF) with respect one of the UL carriers, and S43 providing an information indicative of the failure and said UL carrier.

Separately monitoring may mean to monitor failure events or retransmissions for each of the plurality of carriers; e.g. using separate RLF counters, and/or separately counting the retransmissions for each of the plurality of carriers. Separately monitoring may further include separately for each carrier determining that a certain threshold number of retransmissions is reached or passed. The certain thresholds may be different for each carrier.

The base station, gNB, may perform the following corresponding step as illustrated by FIG. 5:

S51: receiving an information of a failure of RLC data packet transmissions with respect to one of the UL carriers.

Said failure has been determined by the UE by monitoring retransmissions of radio link control, RLC, data packets separately for at least two of the plurality of UL carriers.

In an embodiment, the primary carrier is a NR UL carrier and the supplementary carrier is a supplementary UL, SUL carrier If an RLC transmission failure is detected on one of the plurality of carriers, an indication indicative of the RLC transmission failure and the carrier where the transmission failure has occurred is generated. In a further step (on a RRC layer), the UE may determine a corresponding carrier RLF, e.g. a NR RLF and/or a SUL RLF.

In an embodiment, UE 200 may comprise functions being classified according to different layers. UE 200 may comprise a RLC entity for performing RLC functions, and an RRC entity for performing RRC functions.

The RLC entity monitors RLC retransmission failures separately for a plurality of carriers e.g. a primary carrier and a supplementary carrier.

If a transmission failure is detected on one of the plurality of carriers, the RLC entity provides an indication indicative of the RLC transmission failure and the carrier where the transmission failure has occurred to the RRC entity. The RRC entity then determines a RLF of the corresponding carrier.

In an embodiment, a RLC transmission failure for a carrier (e.g. primary or supplementary carrier) is assumed, if a given maximum number of RLC retransmissions for a RLC data packet (RLC AM PDU) has been reached (or exceeded) for such carrier. Consequently, the RLC entity may send a report indicative of an RLC transmission failure and the corresponding carrier to the RRC layer.

The given maximum number may be similar for the different carriers or may be different e.g. for the NR UL carrier and the SUL.

In an embodiment, the network, e.g. the gNB, may configure different RLC configurations for the different carriers, e.g. for the SUL carrier and the NR carrier. Thereto, different maximum numbers of RLC retransmissions for triggering of RLF failure can be configured for SUL carrier and NR carrier.

In an embodiment, assuming that the NR UL carrier may be deployed at a higher carrier frequency than that for SUL carrier, meaning that NR UL carrier may be associated with higher sub-carrier spacing (i.e., shorter slot duration), a higher maximum number of RLC retransmissions may be configured for NR UL carrier, while a lower maximum number of RLC retransmissions for SUL carrier. In this way, unnecessary RLF events may be avoided.

In an embodiment, a common RLC configuration for both the SUL carrier and the NR carrier with a common counter for RLC retransmissions for both carrier is provided. For the same RLC data packet (RLC AM PDU), there may be a portion of the RLC retransmissions carried on NR UL carrier while the rest of RLC retransmissions are carried in SUL carrier. In this case, when the maximum number of RLC retransmissions for a RLC AM PDU has been reached, the RLC entity may sends a report to the RRC layer, indicating that the maximum RLC retransmissions has been reached without sending an indicator of any carrier.

FIG. 6 illustrates exemplary steps performed by the UE 200:

S61: performing retransmissions of a certain RLC data packet on at least two of the plurality of UL carriers, S62: monitoring retransmissions of a radio link control, RLC, data packet commonly for both UL carriers, and S63: providing an information indicative of a common RLF.

Commonly monitoring may mean to monitor failure events or retransmissions together for the plurality of carriers; e.g. using one single RLF counter for all the carriers, and/or counting the failures together for all of the plurality of carriers. Commonly monitoring may further include determining that a certain threshold number of retransmissions for all the carriers together is reached or passed.

FIG. 7 shows a corresponding exemplary step performed in the base station, gNB 100:

S71: receiving from the UE 200 an information indicative of a common RLF, wherein a common RLF is resulting from performing retransmissions at the UE of a certain RLC data packet on at least two of the plurality of UL carriers being commonly monitored for both UL carriers.

In an embodiment, the gNB may configure the UE how to count RLC retransmissions on the different carriers.

In an option thereto, the UE may be configured such that the UE RLC only counts RLC retransmissions on one specific carrier (e.g. NR UL carrier or SUL) for reporting an RLC transmission failure.

In another option, the UE may be configured such that the UE RLC counts RLC retransmissions on all carriers for reporting an RLC transmission failure.

In an embodiment, if an NR-RLF is triggered, or a report sent by RLC entity indicating an (RLC) data transmissions failure (indicating that the RLC data does get through on the NR carrier), the UE may take one of the following actions:

If the SUL carrier is configured and active, the UE triggers a scheduling request, SR, transmission on the SUL carrier indicating that the UE is preferring to switch to the SUL carrier for UL data transfer. This action may only be performed, if the DL channel quality (such as RSRP) is below a given threshold.

If the SUL carrier is deactivated or if there is no available PUCCH-SR resource for the corresponding logical channel, LCH, on it, the UE may trigger an access to a random-access channel, RACH (that is a shared channel used by wireless terminals to access the mobile network) on the SUL carrier indicating that the data (RLC) transmissions don't get through on the NR carrier.

In response to receiving an indication about an RLF failure of one carrier (e.g. the NR UL carrier) the network (gNB) can take proper actions. In an embodiment, the gNB may order the UE to switch to another carrier (e.g. to the SUL carrier) for the PUSCH transmission.

PUCCH-SR resources may be configured for the corresponding LCHs accordingly.

The gNB may further configure the existing SUL carrier to be active, or may reconfigure the UE with another active SUL carrier if the existing SUL is inactive.

In another option, the UE (e.g. the UE media access, MAC, entity) may signal to the network (gNB) that the data (RLC) transmission gets stuck on the NR carrier. The signaling be performed by means of RRC, MAC CE, and/or any other layer1/layer2 signaling means.

In an embodiment, if an SUL-RLF is triggered, or a report is received that is sent by RLC entity indicating that the (RLC) data transmissions don't get through on the SUL carrier, the UE may take one of the following actions to recover from the failure:

The UE first performs a cell search to determine the best cell for radio link re-establishment. The UE may select a prepared cell, which may be the same cell, a different cell from the same gNB, or a prepared cell from a different gNB, wherein the activity can be resumed (the UE staying in connected mode) via radio connection re-establishment procedure since the previous UE context can be achieved by inter-cell communication.

The UE may determine the best cell based a configuration by the network. Therein, The UE may be configured to:
  only select the cells that support SUL carrier;
  select cells considering measurements on both DL and UL radio link quality. For each cell, the UE may estimate UL radio link quality of each carrier belonging to the same cell (e.g. considering the carrier frequencies), or collect measurements that are provided by the network, or utilize previously acquired (historic) measurement data. In one example thereto, assuming two candidate cells available for a UE, wherein cell 1 is configured with an SUL carrier and an NR UL carrier, and cell 2 is not configured with SUL carrier in UL, the UE may select cell 1 although the DL radio link quality of cell 2 is better. Such selection may be performed under the condition that the DL radio link quality of both cells is above a certain minimum quality threshold and/or the SUL carrier provides a larger path gain than that of the NR UL carrier. Such selection may be advantageous considering that the UL measurement is more important for cell selection than that of DL (as a specific example, the DL RSRP threshold for candidate cell selection may configured may be −90 dBm. As an example, for cell 1, a DL RSRP is measured at −85 dBm. Further exemplarily, the SUL carrier may give about 7 dB larger path gain than that of NR UL carrier. As an example, the DL RSRP of cell 2 is measured at around −82 dBm. In this case, a UE shall select cell 1 since the uplink radio quality of cell 1 is 4 dB better than that of cell 2.
  select the best cell, only based on measurements of the DL radio channel quality; and or
  consider a load measurement of the cell, and the load of each carrier belonging to the same cell.

In an embodiment, the network may configure the UE, if a RLF is triggered due to RLC retransmission failures (e.g. if the RLC retransmissions for a RLC AM PDU reaches a configured threshold) on a specific UL carrier, or on all UL carriers belonging to the same cell. When RLF is triggered, the same or similar recovery actions as described before may applied.

In an embodiment, upon triggering of RLF, if there is no prepared cell available for radio connection re-establishment, the UE leaves the RRC connected state, and enters the RRC Idle state. The UE may then select the best cell which is not prepared. The selection of best cell may be performed as described above.

In an embodiment, when a random access, RA, procedure for radio connection re-establishment for a UE is determined to a NR cell with SUL carrier, one of the following rules or policies can be configured by the network for such procedure:
  the UE shall always select the SUL carrier for RACH access in the target cell.
  the UE shall select the nearest PRACH transmission occasion independently if the corresponding PRACH resource is on the SUL carrier or on the NR UL carrier.
  the UE shall still select the UL carrier for RACH access based on the existing policy, e.g. the UE may select the NR UL carrier if the DL RSRP is higher than a certain (preconfigured) threshold, otherwise, the EU selects the SUL carrier.
  the UE may initiate RACH accesses on both carriers in parallel, so that RACH access on at least one carrier can be acknowledged. When one carrier is acknowledged, RACH access on the other carrier may be stopped.

The configuration for radio link maintenance at RLF can be configured via UE specific RRC signaling or broadcasting SIB.

In the following, above embodiments are enhanced to comprise further features:

In a first embodiment, a UE RLC entity shall report which carrier, of a SUL carrier and the NR UL carrier where the maximum RLC retransmission attempts have been reached.
  If the maximum number of RLC retransmissions for a RLC AM PDU has been reached in NR UL carrier, the RLC entity send a report, which includes the RLC transmission failure information and the UL carrier indicator, to the RRC and the RRC may determine an NR-RLF.
  If the maximum number of RLC retransmissions for a RLC AM PDU has been reached in SUL carrier, the RLC entity send a report, which includes the RLC transmission failure information and the UL carrier indicator, the RLC entity send a report to the RRC and the RRC may determine an SUL-RLF.

In a second embodiment, the base station (gNB) may configure different RLC configurations for SUL carrier and NR carrier, wherein, different maximum number of RLC retransmissions for triggering of RLF failure can be configured for SUL carrier and NR carrier. It may be assumed that the NR UL carrier is deployed at a higher carrier frequency than that for SUL carrier, meaning that NR UL carrier may be associated with higher sub-carrier spacing (i.e., shorter slot duration); thus, a higher maximum number of RLC retransmissions may be configured for NR UL carrier, while a lower maximum number of RLC retransmissions for SUL carrier may be configured. In such way, unnecessary RLF events may be avoided.

In a third embodiment, it may be assumed that there is only one RLC configuration for both SUL carrier and NR carrier. There may be a common counter for RLC retransmissions for both carriers. For the same RLC AM PDU, there may be a portion of the RLC retransmissions carried on NR UL carrier while the rest of RLC retransmissions are carried in SUL carrier. In this case, when the maximum number of RLC retransmissions for a RLC AM PDU has been reached, the RLC entity sends a report to RRC, indicating that the maximum RLC retransmissions has been reached, the carrier indicators may not be present in the report.

In a fourth embodiment, the base station (gNB) may configure the UE to determine on which carriers to count RLC retransmissions. In one option, the UE RLC may only count RLC retransmissions on one specific carrier for RLF trigger. In another option, the UE RLC may count RLC retransmissions on all carriers for RLF trigger.

As an additional consideration, if the RLC entity may need to be aware of the carrier on which every PUSCH transmission is transmitted, such knowledge may be informed to higher layers by the physical, PHY, layer.

The next embodiments concern different option of UE actions upon detection of RLF events that are described in above sections (radio connection maintenance).

Thereto, in a fifth embodiment, if an NR RLF is triggered, or a report is sent by the RLC entity indicating that the (RLC) data transmissions don't get through on the NR carrier, the UE may take one or a plurality of actions as follows:

If the SUL carrier is configured and active and there is an PUCCH-SR resource configured for the corresponding LCH in SUL carrier, the UE MAC triggers a SR transmission on the SUL carrier indicating that the UE is preferring to switch to the SUL carrier for UL data transfer. This action may be only applicable in case the DL channel quality (such as RSRP) is below a given threshold.

If the SUL carrier is deactivated or there is no available PUCCH-SR resource for the corresponding LCH on it, the UE MAC triggers a RACH access on SUL carrier indicating that the data (RLC) transmissions don't get through on the NR carrier. The gNB can take proper actions, for instance, the gNB may order the UE to switch to SUL carrier for the PUSCH transmission. PUCCH-SR resources may be configured for the corresponding LCHs accordingly. The gNB may configure the existing SUL carrier to be active, or reconfigure the UE with another active SUL carrier if the existing SUL is inactive.

Optionally, the UE MAC may signal to the gNB that the data (RLC) transmission gets stuck on the NR carrier. The signaling options may include RRC, MAC CE, or other L1/L2 signaling means.

In a sixth embodiment, if an SUL RLF is triggered, or a report is received that is sent by RLC entity indicating that the (RLC) data transmissions don't get through on the SUL carrier, the UE may take one or a plurality of actions as follows to recover from the failure:

The UE shall first perform cell search to determine the best cell for radio link re-establishment. UE can select a prepared cell, which may be the same cell, a different cell from the same gNB, or a prepared cell from a different gNB, wherein the activity can be resumed (i.e., the UE stays in connected mode) via radio connection re-establishment procedure since the previous UE context can be achieved by inter-cell communication.

Compared to the existing LTE RLF recovery procedure, the additional procedure is that the UE determines the best cell based on different means which may be configured by the network
the UE may only select the cells that support SUL carrier;
the UE may select the cells considering measurements on; both DL and UL radio link quality. For each cell, the UE may estimate UL radio link quality of each carrier belonging to the same cell, considering the carrier frequencies, or collect measurements that are provided by the network, or utilize the historic measurement data etc. In one example, assuming a DL RSR threshold of −90 dBm is configured for candidate cell selection, there are two candidate cells available for a UE. For Cell 1 which is configured with an SUL carrier and an NR UL carrier, DL RSRP is measured at −85 dBm. The SUL carrier gives about 7 dB larger path gain than that of NR UL carrier. The cell 2 is not configured with SUL carrier in UL. Its measured DL RSRP is around −82 dBm. In this case, a UE shall select Cell 1 since Cell 1's uplink radio quality is 4-dB better than that of Cell 2. It makes sense in this example because the UL measurement is more important for cell selection than that of DL, given the fact that RLF is triggered upon time out of the uplink RLC retransmissions;
the UE may select the best cell, purely based on measurements of the DL radio channel quality; and or
the UE may also consider the load measurement of the cell, and the load of each carrier belonging to the same cell.

In a seventh embodiment, the network may configure the UE if RLF is triggered due to RLC retransmission failures (i.e., the RLC retransmissions for a RLC AM PDU reaches a given threshold which can be configured) on a specific UL carrier, or on all UL carriers belonging to the same cell. When RLF is triggered, the same recovery actions as described in the sixth embodiment is applied.

In an eighth embodiment, upon triggering of RLF, if there is no any prepared cell available for radio connection re-establishment, the UE leaves RRC connected state, and stays at RRC Idle state. the UE selects best cell which is not prepared. The selection of best cell applies the same means as that in the sixth embodiment.

In a ninth embodiment, when a RA procedure for radio connection re-establishment for a UE is determined to a NR cell with SUL carrier, one of the following policy can be configured by the network for RA procedure:
the UE shall always select the SUL carrier for RACH access in the target cell.
the UE shall select the nearest PRACH transmission occasion, no matter the corresponding PRACH resource is on SUL carrier or NR UL carrier.
that the UE shall still select the UL carrier for RACH access based on the existing policy, e.g., the UE selects NR UL carrier if DL RSRP is higher than a preconfigured threshold, otherwise, select the SUL carrier.
the UE may initiate RACH accesses on both carriers in parallel, so that RACH access on at least one carrier can be acknowledged. When one carrier is acknowledged, RACH access on the other carrier is stopped.

In a tenth embodiment, the specific configuration for radio link maintenance at RLF can be configured via UE specific RRC signaling or broadcasting SIB.

FIG. 6 illustrates UE 200 in accordance with one or more embodiments. UE 200 comprises an antenna or antenna array 210 having multiple antennas 215, a transceiver 220 for communicating with the base station, UE processing circuitry 230 e.g. for performing the steps depicted in any of FIGS. 2 and 4 and a UE memory 240 for storing corresponding instructions to performed by the UE processing circuitry 240.

FIG. 7 illustrates base station or gNB 100 in accordance with one or more embodiments. Base station 100 comprises an antenna or an antenna array 110 having multiple antennas 115, a transceiver 120 for communicating with the UE, base station processing circuitry 130 e.g. for performing the steps depicted in any of FIGS. 1 and 3 and a base station memory 140 for storing corresponding instructions to performed by the base station processing circuitry 140.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure.

One or more of the various embodiments improve the performance of OTT services provided to the UE 3330 using the OTT connection 3350, in which the wireless connection 3370 forms the last segment. More precisely, the teachings of these embodiments may improve the latency or power consumption and thereby provide benefits such as better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 35 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 14, 15:
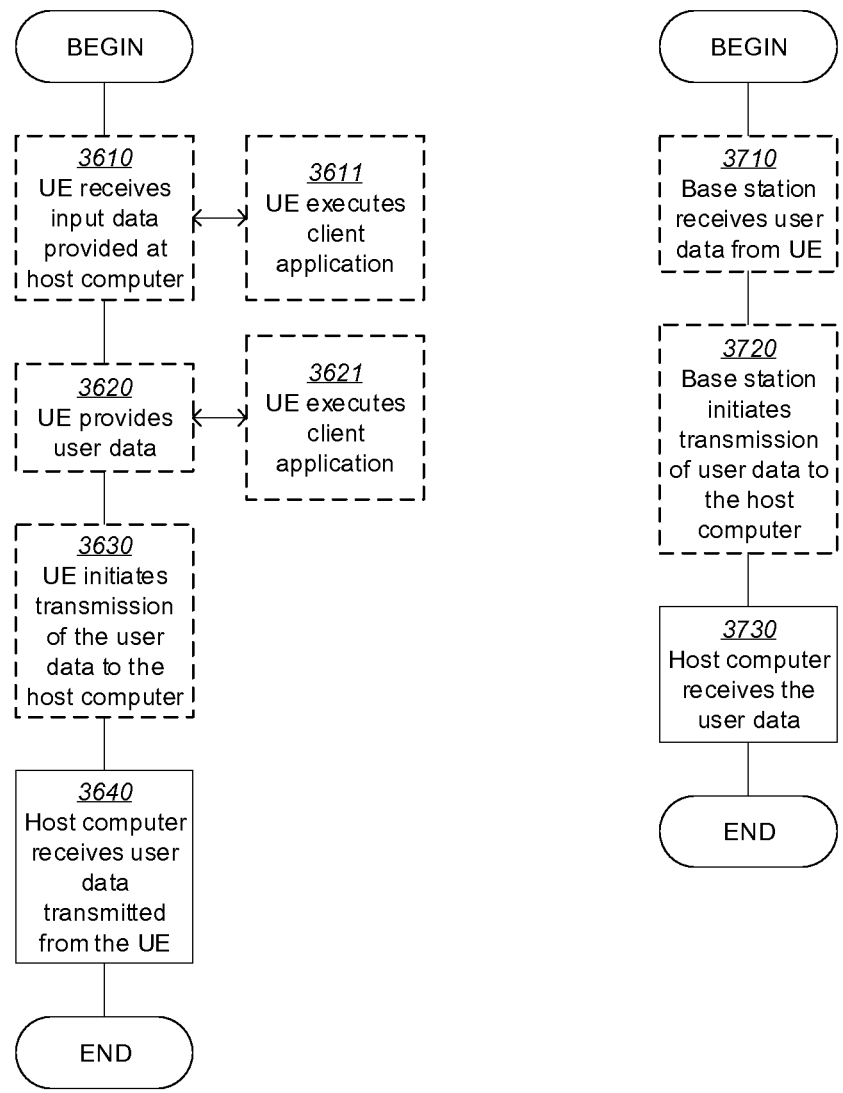

FIG. 14 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 36 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 37 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Further Embodiments

1. A method in a user equipment, UE, for handling radio link failures, wherein the UE is connected to a radio communication network by means of a plurality of uplink, UL, carriers, comprising:
   monitoring retransmissions of radio link control, RLC, data packets separately for a plurality of UL carriers,
   determining a failure of RLC data packet transmissions with respect one of the UL carriers, and
   providing an information indicative of the failure and said UL carrier.
2. The method of the preceding embodiment, wherein the plurality of UL carriers comprises a primary UL carrier and a supplementary UL, SUL, carrier.
3. The method of the preceding embodiment, wherein the primary is a new radio, NR, UL carrier.
4. The method of any of the preceding embodiments, wherein the UE transmits an information indicative of a radio link failure, RLF, and the UL carrier affected by the RLF to the radio communications network.
5. The method of any of the preceding embodiments, wherein the failure of RLC data packet transmissions for said carrier is determined, if a certain maximum number of RLC retransmissions for a RLC data packet has been reached for that carrier.
6. The method of the preceding embodiment, wherein each of the plurality of carriers is associated to a maximum number, e.g. such that a first maximum number is associated to the primary UL carrier and a second maximum number is associated to the SUL carrier.
7. The method of the preceding embodiment, wherein the first maximum number is different from the second maximum number.
8. The method of any of the preceding embodiments, wherein the UE receives a configuration from the network to trigger radio link failures, RLFs, for the different UL carriers.
9. The method of the preceding embodiment, wherein a first configuration to trigger the RLF for the primary UL carrier is different from a second configuration to trigger the RLF for the SUL carrier.
10. The method of the preceding embodiment, wherein the configuration to trigger the RLF for the primary UL carrier and the configuration to trigger the RLF for the SUL carrier are different in that the first configuration comprises a first maximum number of RLC retransmissions, and the second configuration comprises a second maximum number of RLC retransmissions, wherein the first and the second maximum numbers are different.
11. The method of the preceding embodiment, wherein the first maximum number is higher than the second maximum number.
12. The method of any of the preceding embodiments, wherein the UE comprise a RLC entity for performing RLC functions, and an RRC entity for performing RRC functions, wherein RLC entity performs the steps of monitoring retransmissions of RLC data packets separately for a plurality of UL carriers, and determining a failure of RLC data packet transmissions with respect one of the UL carriers, and provides the information indicative of the failure and said UL carrier to the RRC entity.
13. The method of the preceding embodiment, wherein the RRC entity performs triggering a radio link failure, RLF at the radio communication network.
14. A method in a user equipment, UE (200), for handling radio link failures, wherein the UE is connected to a radio communication network by means of a plurality of uplink, UL, carriers, comprising:
    performing retransmissions of a certain RLC data packet on at least two of the plurality of UL carriers,
    monitoring retransmissions of a radio link control, RLC, data packet commonly for both UL carriers, and
    providing an information indicative of a common RLF.
15. The method of the preceding embodiment, wherein the UE provides:
    an information indicative of a radio link failure, RLF, without an information of a UL carrier that is affected by the RLF, if it is configured to commonly monitor the retransmissions for the at least two UL carriers, and
    an information of a RLF and the UL carrier affected by the RLF to the radio communications network and an UL carrier being affected by the RLF, if it is configured to separately monitor the retransmissions for the at least two UL carriers.
16. The method of the preceding embodiments 14-15, wherein the UE is configured to perform at least one of:
    counting RLC retransmissions on one or a plurality of specific carrier (e.g. NR UL carrier or SUL) for reporting an RLC transmission failure, and
    counting RLC retransmissions on all carriers for reporting an RLC transmission failure.
17. The method of any of the preceding embodiments, wherein in case of a failure of RLC data packet transmissions with respect the primary UL carrier, one of the following steps is performed:
    if the SUL carrier is configured (and active), triggering a scheduling request, SR, transmission on the SUL carrier indicating that the UE is preferring to switch to the SUL carrier for UL data transfer, and
    else triggering an access to a random-access channel, RACH on the SUL carrier indicating the failure, or
    signaling an information to the network (gNB) that the data (RLC) transmission gets stuck on the primary (NR) carrier (the signaling options may include RRC, MAC CE, or other L1/L2 signaling means; the signaling may be transmitted on SUL carrier).
18. The method of the preceding embodiment, wherein triggering the SR transmission on the SUL carrier is only be performed, if the downlink channel quality (RSRP) is below a given threshold.
19. The method of any of the preceding embodiments, wherein if an SUL RLF is triggered, the UE first perform a cell search to determine a suitable cell for radio link re-establishment.
20. The method of the preceding embodiment, wherein the UE select a prepared cell, which may be the same cell, a different cell from the same base station (gNB), or a prepared cell from a different base station (gNB).
21. The method of the preceding embodiment, wherein the UE is configured to:
   select a cell out of one or a plurality of cells that support a SUL carrier;
   select cells based on measurements on both DL and UL radio link quality;
   select a cell only based on measurements of the DL radio channel quality; and or
   select a cell based on a load measurement of the cell, and the load of each carrier belonging to the same cell.
22. The method of the previous embodiment, wherein if a first cell is configured with an SUL carrier and a primary UL carrier, and a second cell is not configured with a SUL carrier, the UE performs
   measuring the DL radio link and the UL radio link quality,
   determining if the DL radio link quality of both cells is above a certain minimum quality threshold and/or if the SUL carrier provides a larger path gain than that of the primary UL carrier, and
   in the affirmative, selecting the first cell.
23. A method in a base station of a radio communications network, gNB (100), for handling radio link failures, wherein a UE is connected to the gNB by means of a plurality of uplink, UL, carriers, comprising:
   receiving an information of a failure of RLC data packet transmissions with respect one of the UL carriers, wherein said failure has been determined by separately monitoring retransmissions of radio link control, RLC, data packets separately for a least two of the plurality of UL carriers.
24. The method of the preceding embodiment, wherein the plurality of UL carriers comprises a primary UL carrier and a supplementary UL, SUL, carrier.
25. The method of the preceding embodiment, wherein the primary is a new radio, NR, UL carrier.
26. The method of any of the preceding embodiments 23-25, wherein the gNB receives an information indicative of a radio link failure, RLF, and the UL carrier affected by the RLF to the radio communications network.
27. The method of any of the preceding embodiments 23-26, sending a configuration to the UE indicative of a maximum number of RLC retransmissions for a RLC data packet to trigger (or assume) the failure of RLC data packet transmissions for said carrier.
28. The method of the preceding embodiment, wherein the configuration comprises a first maximum number associated to the primary UL carrier and a second maximum number is associated to the SUL carrier.
29. The method of the preceding embodiment, wherein the first maximum number is different from the second maximum number.
30. The method of any of the preceding embodiments 23-29, wherein the gNB transmits a configuration to the UE to trigger radio link failures, RLFs, for the different UL carriers.
31. The method of the preceding embodiment, wherein a first configuration to trigger the RLF for the primary UL carrier is different from a second configuration to trigger the RLF for the SUL carrier.
32. The method of the preceding embodiment, wherein the configuration to trigger the RLF for the primary UL carrier and the configuration to trigger the RLF for the SUL carrier are different in that the first configuration comprises a first maximum number of RLC retransmissions, and the second configuration comprises a second maximum number of RLC retransmissions, wherein the first and the second maximum numbers are different.
33. The method of the preceding embodiment, wherein the first maximum number is higher than the second maximum number.
34. A method in a gNB (100) for handling radio link failures, wherein the gNB is connected to a UE by means of a plurality of uplink, UL, carriers, comprising:
   receiving from the UE an information indicative of a common RLF, wherein a common RLF is resulting from performing retransmissions at the UE of a certain RLC data packet on at least two of the plurality of UL carriers being commonly monitored for both UL carriers.
35. The method of the preceding embodiment, wherein the gNB UE receives:
   an information indicative of a radio link failure, RLF, without an information of a UL carrier that is affected by the RLF, if it is configured to commonly monitor the retransmissions for the at least two UL carriers, and
   an information of a RLF and the UL carrier affected by the RLF to the radio communications network and an UL carrier being affected by the RLF, if it is configured to separately monitor the retransmissions for the at least two UL carriers.
36. The method of the preceding embodiments 34-35, wherein the gNB configures the UE to perform at least one of:
   counting RLC retransmissions on one or a plurality of specific carrier (e.g. NR UL carrier or SUL) for reporting an RLC transmission failure, and
   counting RLC retransmissions on all carriers for reporting an RLC transmission failure.
37. The method of any of the preceding embodiments 23-36, wherein in case of a failure of RLC data packet transmissions with respect the primary UL carriers, one of the following steps is performed:
   if the SUL carrier is configured (and active), receiving a scheduling request, SR, transmission on the SUL carrier indicating that the UE is preferring to switch to the SUL carrier for UL data transfer, and
   else receiving an access to a random-access channel, RACH on the SUL carrier indicating the failure.
38. The method of any the preceding embodiments 23-37, wherein the gNB configures the UE to:
   select a cell out of one or a plurality of cells that support a SUL carrier;
   select cells based on measurements on both DL and UL radio link quality;
   select a cell only based on measurements of the DL radio channel quality; and or
   select a cell based on a load measurement of the cell, and the load of each carrier belonging to the same cell.
39. The method of the previous embodiment, further comprising configuring a first cell with an SUL carrier and a primary UL carrier, and a second cell without a SUL carrier, and the UE to perform:
   measuring the DL and the UL radio link quality,
   determining if the DL radio link quality of both cells is above a certain minimum quality threshold and/or if the SUL carrier provides a larger path gain than that of the primary UL carrier, and in the affirmative, selecting the first cell.

40. A user equipment, UE, for handling radio link failures, wherein the UE is connected to a radio communication network by means of a plurality of uplink, UL, carriers, comprising processing circuity and a memory, wherein the processing circuity is configured to:

monitoring retransmissions of radio link control, RLC, data packets separately for a plurality of UL carriers, determining a failure of RLC data packet transmissions with respect one of the UL carriers, and providing an information indicative of the failure and said UL carrier.

41. A user equipment, UE, for handling radio link failures, wherein the UE is connected to a radio communication network by means of a plurality of uplink, UL, carriers, comprising processing circuity and a memory, wherein the processing circuity is configured to:

performing retransmissions of a certain RLC data packet on at least two of the plurality of UL carriers, monitoring retransmissions of a radio link control, RLC, data packet commonly for both UL carriers, and providing an information indicative of a common RLF.

42. A user equipment, UE, for handling radio link failures, wherein the UE is connected to a radio communication network by means of a plurality of uplink, UL, carriers, and wherein the UE is adapted to perform the methods of any of the preceding embodiments 1-24.

43. A base station of a radio communications network, gNB, for handling radio link failures, wherein a UE is connected to the gNB by means of a plurality of uplink, UL, carriers, comprising processing circuity and a memory, wherein the processing circuity is configured to:

receiving an information of a failure of RLC data packet transmissions with respect one of the UL carriers, wherein said failure has been determined by separately monitoring retransmissions of radio link control, RLC, data packets separately for a least two of the plurality of UL carriers.

44. A base station of a radio communications network, gNB, for handling radio link failures, wherein a UE is connected to the gNB by means of a plurality of uplink, UL, carriers, comprising processing circuity and a memory, wherein the processing circuity is configured to:

receiving from the UE an information indicative of a common RLF, wherein a common RLF is resulting from performing retransmissions at the UE of a certain RLC data packet on at least two of the plurality of UL carriers being commonly monitored for both UL carriers.

45. A base station of a radio communications network, gNB, wherein the gNB is connected to a UE by means of a plurality of uplink, UL, carriers, and wherein the UE is adapted to perform the methods of any of the preceding embodiments 23-39.

46. A communication system including a host computer comprising processing circuitry configured to provide user data; and a communication interface configured to forward the user data to a cellular network for transmission to a user equipment, UE, wherein the cellular network comprises a base station, gNB having a radio interface and processing circuitry, the base station's processing circuitry configured to:

receiving an information of a failure of RLC data packet transmissions with respect one of the UL carriers, wherein said failure has been determined by separately monitoring retransmissions of radio link control, RLC, data packets separately for a least two of the plurality of UL carriers.

47. A communication system including a host computer comprising processing circuitry configured to provide user data; and a communication interface configured to forward the user data to a cellular network for transmission to a user equipment, UE, wherein the cellular network comprises a base station, gNB having a radio interface and processing circuitry, the base station's processing circuitry configured to:

receiving from the UE an information indicative of a common RLF, wherein a common RLF is resulting from performing retransmissions at the UE of a certain RLC data packet on at least two of the plurality of UL carriers being commonly monitored for both UL carriers.

48. The communication system of embodiment 46 or 47, further including the base station.

49. The communication system of embodiment 48, further including the UE, wherein the UE is configured to communicate with the base station.

50. The communication system of embodiment 49, wherein:

the processing circuitry of the host computer is configured to execute a host application, thereby providing the user data; and the UE comprises processing circuitry configured to execute a client application associated with the host application.

51. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one of:

receiving from the UE an information indicative of a common RLF, wherein a common RLF is resulting from performing retransmissions at the UE of a certain RLC data packet on at least two of the plurality of UL carriers being commonly monitored for both UL carriers, and receiving an information from the UE of a failure of RLC data packet transmissions with respect one of the UL carriers, wherein said failure has been determined by separately monitoring retransmissions of radio link control, RLC, data packets separately for a least two of the plurality of UL carriers.

52. The method of embodiment 51, further comprising: at the base station, transmitting the user data.

53. The method of embodiment 52, wherein the user data is provided at the host computer by executing a host application, the method further comprising:

at the UE, executing a client application associated with the host application.

54. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform one of:
monitoring retransmissions of radio link control, RLC, data packets separately for a plurality of UL carriers, determining a failure of RLC data packet transmissions with respect one of the UL carriers, and providing an information indicative of the failure and said UL carrier, and.
performing retransmissions of a certain RLC data packet on at least two of the plurality of UL carriers, monitoring retransmissions of a radio link control, RLC, data packet commonly for both UL carriers, and providing an information indicative of a common RLF.

55. The communication system of embodiment 54, further including the UE.

56. The communication system of embodiment 55, wherein the cellular network further includes a base station configured to communicate with the UE.

57. The communication system of embodiment 55 or 56, wherein:
the processing circuitry of the host computer is configured to execute a host application, thereby providing the user data; and
the UE's processing circuitry is configured to execute a client application associated with the host application.

The invention claimed is:

1. A method in a user equipment (UE) in dual connectivity mode for handling radio link failures; wherein the UE is connected to a radio communication network by a plurality of uplink (UL) carriers; the method comprising:
performing retransmissions of a certain Radio Link Control (RLC) data packet on at least two of the plurality of UL carriers that are separate, wherein one link is a primary UL carrier and the other link is a supplementary UL (SUL) carrier;
monitoring retransmissions of a RLC data packet commonly for all of the at least two UL carriers using a single retransmission counter for both of the primary UL carrier and the SUL carrier in dual connectivity mode;
providing information indicative of a common Radio Link Failure (RLF) for the at least two UL carriers;
wherein the UE is configured to select a cell based on one or more of the following criteria:
select a cell out of one or a plurality of cells that support a SUL carrier;
select a cell based on measurements on both Downlink (DL) and UL radio link quality;
select a cell only based on measurements of the DL radio channel quality; and
select a cell based on a load measurement of the cell, and the load of each carrier belonging to the same cell; and
wherein, if a first cell is configured with a SUL carrier and the primary UL carrier, and a second cell is not configured with a SUL carrier, the UE performs:
measuring DL radio link quality and UL radio link quality;
determining if the DL radio link quality of both the first and second cells is above a certain minimum quality threshold and/or if the SUL carrier provides a larger path gain than that of the primary UL carrier; and
based on the determining be in the affirmative, selecting the first cell.

2. The method of claim 1, wherein the UE provides information indicative of a RLF:
with information identifying the UL carrier affected by the RLF, if the UE is configured to separately monitor the retransmissions for the at least two UL carriers; else
without information identifying the UL carrier that is affected by the RLF, if the UE is configured to commonly monitor the retransmissions for the at least two UL carriers.

3. The method of claim 1, wherein the UE is configured to perform:
commonly counting RLC retransmissions associated to all of the at least two of the plurality of UL carriers for reporting the common RLF; and/or
separately counting RLC retransmissions associated to each of the at least two of the plurality of UL carriers, for reporting the RLF of a separately affected UL carrier.

4. The method of claim 1, wherein, in response to a failure of RLC data packet transmissions with respect the primary UL carrier:
triggering, if the SUL carrier is configured, a scheduling request (SR) transmission on the SUL carrier indicating that the UE is preferring to switch to the SUL carrier for UL data transfer; or else triggering an access to a Random Access Channel (RACH) on the SUL carrier indicating the failure; or
signaling to the network that the data RLC transmission gets stuck on the primary carrier.

5. The method of claim 4, wherein triggering the SR transmission on the SUL carrier is only performed if the downlink channel quality is below a certain threshold.

6. The method of claim 1, wherein, if the SUL RLF is triggered, the UE performs a cell search to determine a suitable cell for radio link re-establishment.

7. The method of claim 6, wherein the UE selects a cell prepared for UL transmissions; wherein the cell is: the same cell, a different cell from the same base station, or a cell from a different base station.

8. A method in a base station in dual connectivity mode for handling radio link failures (RLF), wherein the base station is connected to a User Equipment (UE) by of a plurality of uplink (UL) carriers; the method comprising:
receiving from the UE retransmissions of a certain Radio Link Control (RLC) data packet that is transmitted on at least two of the plurality of UL carriers that are separate, wherein one link is a primary UL carrier and the other link is a supplementary UL (SUL) carrier;
providing acknowledgement feedback to the UE for the retransmissions of the RLC data packet to enable common monitoring of the least two UL carriers at the UE using a single retransmission counter;
receiving, from the UE, information indicative of a common RLF for both of the primary UL carrier and the SUL carrier in dual connectivity mode determined based on the signal retransmission counter;
wherein the base station configures the UE to select a cell based on one or more of the following criteria:
select a cell out of one or a plurality of cells that support a SUL carrier;
select a cell based on measurements on both Downlink (DL) and UL radio link quality;
select a cell only based on measurements of DL radio channel quality; and
select a cell based on a load measurement of the cell, and the load of each carrier belonging to the same cell; and configuring a first cell with an SUL carrier and the primary UL carrier, and configuring a second cell without a SUL carrier; and configuring the UE to perform:
- measuring the DL and the UL radio link quality;
- determining if the DL radio link quality of both the first and second is above a certain minimum quality threshold and/or if the SUL carrier provides a larger path gain than that of the primary UL carrier; and
- based on the determining be in the affirmative, selecting the first cell.

9. The method of claim 8, wherein the base station receives, from the UE, information indicative of a RLF:
- with information identifying the UL carrier affected by the RLF to the radio communications network, if the base station has configured the UE to monitor the retransmissions for each of the at least two UL carriers; else
- without information identifying the UL carrier that is affected by the RLF, if the base station has configured the UE to commonly monitor the retransmissions for the at least two UL carriers.

10. The method of claim 8, wherein the base station configures the UE to perform:
- commonly counting RLC retransmissions associated to all of the at least two of the plurality of UL carriers, for reporting the common RLF; and/or
- separately counting RLC retransmissions associated to each of the at least two of the plurality of UL carriers, for reporting the RLF of a separately affected UL carrier.

11. The method of claim 8, wherein, in response to a failure of RLC data packet transmissions with respect to primary UL carriers, one of the following is performed:
- if the SUL carrier is configured, receiving a scheduling request (SR) transmission on the SUL carrier indicating that the UE is preferring to switch to the SUL carrier for UL data transfer; or else
- receiving an access to a Random Access Channel (RACH) on a SUL carrier indicating the failure.

12. A user equipment (UE) in dual connectivity mode for handling radio link failures (RLF); wherein the UE is connected to a radio communication network by of a plurality of uplink (UL) carriers; the UE comprising:
- processing circuitry;
- memory containing instructions executable by the processing circuitry whereby the UE is operative to:
  - perform retransmissions of a certain Radio Link Control (RLC) data packet on at least two of the plurality of UL carriers that are separate, wherein one link is a primary UL carrier and the other link is a supplementary UL (SUL) carrier;
  - monitor retransmissions of a RLC data packet commonly for the at least two UL carriers using a single retransmission counter for both of the primary UL carrier and the SUL carrier in dual connectivity mode;
  - provide information indicative of a common RLF for the at least two UL carriers;
  - wherein the UE is configured to select a cell based on one or more of the following criteria:
    - select a cell out of one or a plurality of cells that support a SUL carrier;
    - select a cell based on measurements on both Downlink (DL) and UL radio link quality;
    - select a cell only based on measurements of the DL radio channel quality; and
    - select a cell based on a load measurement of the cell, and the load of each carrier belonging to the same cell; and
  - wherein, if a first cell is configured with a SUL carrier and the primary UL carrier, and a second cell is not configured with a SUL carrier, the UE performs:
    - measuring DL radio link quality and UL radio link quality;
    - determining if the DL radio link quality of both the first and second cells is above a certain minimum quality threshold and/or if the SUL carrier provides a larger path gain than that of the primary UL carrier; and
    - based on the determining be in the affirmative, selecting the first cell.

13. A base station of a radio communications network in dual connectivity mode for handling radio link failures (RLF; wherein a UE is connected to the based station by of a plurality of uplink (UL) carriers; the base station comprising:
- processing circuitry;
- memory containing instructions executable by the processing circuitry whereby the base station is operative to:
  - receive from the UE retransmissions of a certain Radio Link Control (RLC) data packet that is transmitted on at least two of the plurality of UL carriers that are separate, wherein one link is a primary UL carrier and the other link is a supplementary UL (SUL) carrier;
  - provide acknowledgement feedback to the UE for the retransmissions of the RLC data packet to enable common monitoring of the least two UL carriers at the UE using a single retransmission counter;
  - receive, from the UE, information indicative of a common RLF for both of the primary UL carrier and the SUL carrier in dual connectivity mode determined based on the single retransmission counter;
  - wherein the base station configures the UE to select a cell based on one or more of the following criteria:
    - select a cell out of one or a plurality of cells that support a SUL carrier;
    - select a cell based on measurements on both Downlink (DL) and UL radio link quality;
    - select a cell only based on measurements of DL radio channel quality; and
    - select a cell based on a load measurement of the cell, and the load of each carrier belonging to the same cell; and
  - configuring a first cell with an SUL carrier and the primary UL carrier, and configuring a second cell without a SUL carrier; and
  - configuring the UE to perform:
    - measuring the DL and the UL radio link quality;
    - determining if the DL radio link quality of both the first and second is above a certain minimum quality threshold and/or if the SUL carrier provides a larger path gain than that of the primary UL carrier; and
    - based on the determining be in the affirmative, selecting the first cell.

14. The method of claim 6, wherein the UE selects a cell prepared for UL transmissions; wherein the cell is the same cell.

* * * * *